US008599390B2

(12) United States Patent
Asai

(10) Patent No.: US 8,599,390 B2
(45) Date of Patent: Dec. 3, 2013

(54) INFORMATION PROCESSING DEVICE, AND METHOD AND COMPUTER READABLE MEDIUM FOR SETTING SECURITY-RELATED OPERATION MODE

(75) Inventor: Norihiko Asai, Gifu (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 1093 days.

(21) Appl. No.: 12/240,547

(22) Filed: Sep. 29, 2008

(65) Prior Publication Data
US 2009/0086246 A1 Apr. 2, 2009

(30) Foreign Application Priority Data

Sep. 28, 2007 (JP) ................................ 2007-254351

(51) Int. Cl.
*G06F 3/12* (2006.01)
(52) U.S. Cl.
USPC ........................................ 358/1.13; 358/1.15
(58) Field of Classification Search
USPC .............................................. 358/1.13, 1.15
See application file for complete search history.

(56) References Cited

U.S. PATENT DOCUMENTS

| 7,073,436 | B2 | 7/2006 | Takahashi |
| 2005/0243153 | A1* | 11/2005 | Takahashi ................. 347/101 |
| 2006/0037029 | A1 | 2/2006 | Yamada |
| 2006/0132842 | A1 | 6/2006 | Nakamura |
| 2006/0212945 | A1* | 9/2006 | Donlin et al. ................. 726/29 |
| 2007/0083621 | A1* | 4/2007 | Nuggehalli ................. 709/221 |

FOREIGN PATENT DOCUMENTS

| JP | 2004-118313 | 4/2004 |
| JP | 2005-193546 | 7/2005 |
| JP | 2005-310029 | 11/2005 |
| JP | 2006-53659 | 2/2006 |
| JP | 2006-92115 | 4/2006 |
| JP | 2006-164042 | 6/2006 |
| JP | 2006-168347 | 6/2006 |
| JP | 2007-156811 | 6/2007 |

OTHER PUBLICATIONS

Japan Patent Application Pulication 2006-164042, IDS (machine translation).*
Machine translation of JP 2004-118313, IDS.*

(Continued)

*Primary Examiner* — Qian Yang
(74) *Attorney, Agent, or Firm* — Scully, Scott, Murphy & Presser, PC

(57) ABSTRACT

An information processing device configured to be connected with an image forming device includes a connection mode detecting unit detecting what kind of a connection mode is established between the information processing device and the image forming device, an operation mode setting unit setting one of a normal mode in which the image forming device performs the image forming operation without user certification and a secure mode in which the image forming device performs the image forming operation after successful user certification, as an operation mode in which the image forming device is controlled to perform an image forming operation, depending on the kind of the connection mode detected, and a driver installing unit installing a driver into the information processing device such that the driver controls the image forming device to perform the image forming operation in the mode set by the operation mode setting unit.

9 Claims, 4 Drawing Sheets

(56) References Cited

OTHER PUBLICATIONS

Notification of Reasons for Rejection dated Jan. 10, 2012 received from the Japanese Patent Office from related Japanese Application No. 2007-254351, together with an English-language translation.

Notification of Reasons for Rejection dated May 22, 2012 received from the Japanese Patent Office from related Japanese Application No. 2007-254351, together with an English-language translation.

Japanese Decision of Rejection together with an English language translation dated Sep. 11, 2012 from related application JP 2007-254351.

* cited by examiner

SECURE PRINTING SETTING SCREEN

INFORMATION PROCESSING DEVICE, AND METHOD AND COMPUTER READABLE MEDIUM FOR SETTING SECURITY-RELATED OPERATION MODE

CROSS-REFERENCE TO RELATED APPLICATION

This application claims priority under 35 U.S.C. §119 from Japanese Patent Application No. 2007-254351 filed on Sep. 28, 2007. The entire subject matter of the application is incorporated herein by reference.

BACKGROUND

1. Technical Field

The following description relates to one or more technologies to install a driver into an information processing device.

2. Related Art

A print system has been known, which includes an image forming device having at least a normal mode and a secure mode as operation modes for performing a printing operation on a sheet based upon print data and an information processing device connected with the image forming device. In the normal mode, the image forming device performs the printing operation immediately after acquiring the print data. Meanwhile, in the secure mode, the image forming device performs the printing operation after previously-defined user certification has successfully been done.

In the aforementioned print system, settings on a sheet to be used (for example, a size of the sheet) and a character to be printed (for example, a font of the character) are accepted through a setting screen displayed on a display unit of the information processing device every time the print data is transmitted from the information processing device to the image forming device. In the same manner, settings on the secure mode is accepted through a setting screen displayed on the display unit of the information processing device every time a printing operation is performed (for example, see Japanese Patent Provisional Publication No. 2005-310029, hereinafter referred to as '029 Publication). Hereinafter, the print system disclosed in '029 Publication will be referred to as a known print system.

Namely, in the known print system, when a user wishes to perform a printing operation in the secure mode, the user has to configure the settings on the secure mode every time the printing operation is executed.

SUMMARY

In the meantime, for a user who often print confidential data, when the known print system is used while a plurality of information processing devices, which includes an information processing device of the user, use a single image forming device in common (hereinafter referred to as a first case), it is desired that the secure mode has previously been set as a default operation mode in which the image forming device is controlled by default.

Further, when the information processing device of the user exclusively uses a single image forming device (hereinafter referred to as a second case), it is possible to keep confidentiality of printed data without having to perform the secure mode printing. Therefore, it is desired that the normal mode has previously been set as the default operation mode.

However, it is unfortunate that a lot of user efforts are needed in the known print system. Specifically, the user has to set the operation modes every time a printing operation is executed when the user cannot understand how to set the default operation mode for controlling the image forming device or when the user sets an improper default operation mode in the first case or the second case.

Aspects of the present invention are advantageous to provide one or more improved information processing devices, installation methods, and computer readable media that make it possible to reduce user efforts required for setting an operation mode for controlling an image forming operation performed by an image forming device connected with the information processing devices.

According to aspects of the present invention, an information processing device configured to be connected with an image forming device is provided. The information processing device includes a connection mode detecting unit configured to detect what kind of a connection mode is established between the information processing device and the image forming device, an operation mode setting unit configured to set one of a normal mode and a secure mode as an operation mode in which the image forming device is controlled to perform an image forming operation, depending on the kind of the connection mode detected by the connection mode detecting unit, the normal mode being a mode in which the image forming device performs the image forming operation without user certification, the secure mode being a mode in which the image forming device performs the image forming operation after successful user certification, and a driver installing unit configured to install a driver into the information processing device such that the driver controls the image forming device to perform the image forming operation in the one of the normal mode and the secure mode set by the operation mode setting unit.

In some aspects of the present invention, the operation mode is set at a time when the driver is installed into the information processing device depending on the kind of the connection mode as detected.

Therefore, in some aspects, it is possible to reduce user efforts required for selecting one of the normal mode and the secure mode as the operation mode each time the image forming operation is performed after the driver is installed into the information processing device.

According to aspects of the present invention, further provided is a method to install a driver into an information processing device configured to be connected with an image forming device. The method includes a connection mode detecting step of detecting what kind of a connection mode is established between the information processing device and the image forming device, an operation mode setting step of setting one of a normal mode and a secure mode as an operation mode in which the image forming device is controlled to perform an image forming operation, depending on the kind of the connection mode detected in the connection mode detecting step, the normal mode being a mode in which the image forming device performs the image forming operation without user certification, the secure mode being a mode in which the image forming device performs the image forming operation after successful user certification, and a driver installing step of installing the driver into the information processing device such that the driver controls the image forming device to perform the image forming operation in the one of the normal mode and the secure mode set in the operation mode setting step.

According to the method configured as above, the same effect as the aforementioned information processing device is provided. Specifically, the operation mode is set at a time when the driver is installed into the information processing device depending on the kind of the connection mode as detected.

Thereby, it is possible to reduce user efforts required for set either the normal mode or the secure mode as the operation mode whenever the image forming operation is performed after the driver is installed into the information processing device.

According to aspects of the present invention, further provided is a computer readable medium having computer executable instructions stored thereon, which cause a computer configured to be connected with an image forming device to perform a connection mode detecting step of detecting what kind of a connection mode is established between the information processing device and the image forming device, an operation mode setting step of setting one of a normal mode and a secure mode as an operation mode in which the image forming device is controlled to perform an image forming operation, depending on the kind of the connection mode detected in the connection mode detecting step, the normal mode being a mode in which the image forming device performs the image forming operation without user certification, the secure mode being a mode in which the image forming device performs the image forming operation after successful user certification, and a driver installing step of installing the driver into the information processing device such that the driver controls the image forming device to perform the image forming operation in the one of the normal mode and the secure mode set in the operation mode setting step.

According to the computer readable medium configured as above, the same effect as the aforementioned information processing device is provided. Specifically, the operation mode is set at a time when the driver is installed into the information processing device depending on the kind of the connection mode as detected.

Thus, it is possible to reduce user efforts required for set either the normal mode or the secure mode as the operation mode every time the image forming operation is performed after the driver is installed into the information processing device.

BRIEF DESCRIPTION OF THE ACCOMPANYING DRAWINGS

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

Hereinafter, an embodiment according to aspects of the present invention will be described with reference to the accompany drawings.

<Regarding Print System>

Figure 1:
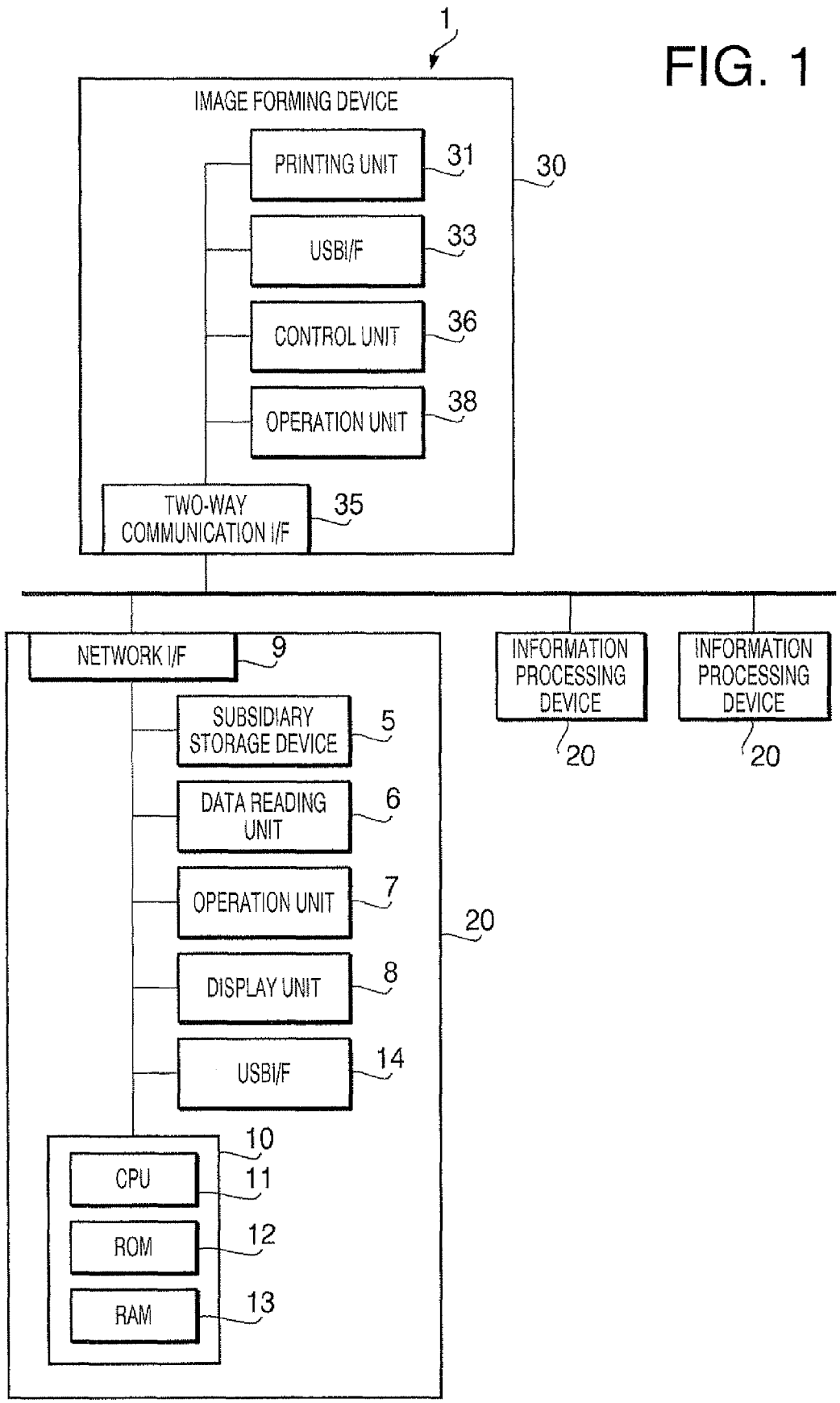
FIG. 1 is a block diagram schematically showing a configuration of a print system in an embodiment according to one or more aspects of the present invention.

FIG. 1 is a block diagram schematically showing a configuration of a print system that includes an information processing device into which a device driver is installed with an installation program in an embodiment according to aspects of the present invention.

A print system 1 is provided with a plurality of information processing devices 20 configured to create print data and at least one image forming device 30 configured to form an image on a recording medium based upon the print data created by the information processing devices 20. The information processing devices 20 and the image forming device 30 are connected to a local area network (LAN). It is noted that the print system 1 may be configured with an information processing device 20 and an image forming device 30 being linked via a USB cable.

In the print system 1, when an information processing device 20 runs a below-mentioned device driver, print data is created and transmitted to the image forming device 30. Then, the image forming device 30, which has received the print data, forms an image on a recording medium based upon the print data.

<Regarding Image Forming Device>

The image forming device 30 includes a printing unit configured to print an image based upon print data on a recording medium such as a sheet, a USB interface (I/F) 33 configured to perform image data communication with an external device such as the information processing devices 20 and a digital camera via a USB cable, and a two-way communication interface (I/F) 35 configured to perform data communication with the information processing devices 20 via the LAN. Further, the image forming device 30 is provided with an operation unit 38 that includes cursor keys and switches for inputting various settings and commands and a display panel configured to display thereon various menu screens, information inputted by a user, and an error display, and a control unit 36 configured to control each element of the image forming device 30 (e.g., the printing unit 31, the USB I/F 33, and the communication I/F 35) in accordance with settings and/or commands inputted through the operation unit 38.

The control unit 36 includes a ROM configured to store thereon various programs, a RAM configured to store thereon data temporarily, an NVRAM configured to store thereon data that has to be saved even though he image forming device 30 is powered OFF, and a CPU configured to execute various processes in accordance with programs.

The ROM includes a printing process program stored thereon that is configured to determine an operation mode in which the image forming device 30 performs an image forming process based upon print data acquired from an information processing device 20 and to perform the image forming process in which an image based upon the print data is printed on a recording medium in the determined operation mode.

In the present embodiment, the operation mode of the image forming device 30 includes a normal mode and a secure mode. In the normal mode, when the print data is acquired, an image is formed based upon the print data without certificating a sender (user) who has transmitted the print data from the information processing device 20 to the image forming device 30. Meanwhile, in the secure mode, when the print data is acquired, the image is formed based upon the print data after certificating the sender of the print data.

Figure 3:
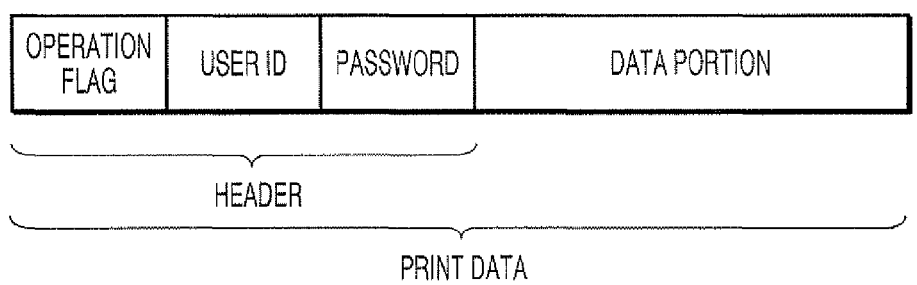
FIG. 3 is an illustration schematically showing a configuration of print data in the embodiment according to one or more aspects of the present invention.

The certification of the print data will be described later. In the meantime, the print data is generated when the information processing device 20 executes the device driver. As illustrated in FIG. 3, the print data includes a header in which information for controlling the image forming device 30 is written and a data portion in which data of the image to be formed on a recording medium is written in a known page description language.

Further, the header includes a flag area, an ID area, and a password area. In the flag area, an operation flag is set that specifies one of the normal mode and the secure mode as the operation mode of the image forming device 30. In the ID area, a user ID representing the sender of the print data is written when the secure mode is specified. In the password area, identification information for identifying the sender of the print data is written when the secure mode is specified.

Figure 6:
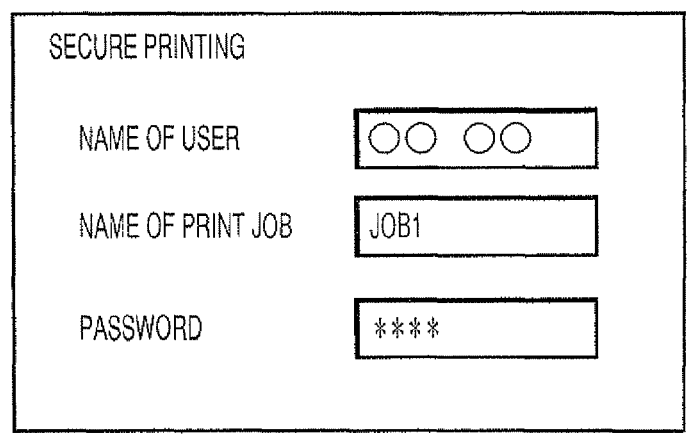
FIG. 6 is a schematic diagram exemplifying a screen image displayed on a display panel in secure printing in the embodiment according to one or more aspects of the present invention.

Specifically, in the image forming device 30, when the operation flag in the print data acquired from the information processing device 20 specifies the normal mode, a printing operation (hereinafter, a printing operation in the normal mode will be referred to as normal printing) is performed immediately after the acquisition of the print data. Meanwhile, when the operation flag in the print data specifies the secure mode, the image forming device 30 (the control unit 36) displays a display screen as shown in FIG. 6 on the display panel of the operation unit 38. Then, when the sender of the print data is certified in accordance with information accepted through the operation unit 38 (e.g., selection of a print job and input of a password), a printing operation (hereinafter, a printing operation in the secure mode will be referred to as secure printing) is performed based upon the print data stored on the NVRAM of the control unit 36. It is noted that "the sender is certified" represents that a password written in the header of the print data selected by the user of the image forming device 30 is identical to the information inputted through the operation unit 38.

<Configuration of Information Processing Device>

Subsequently, the information processing devices 20 will be described. As shown in FIG. 1, each of the information processing devices 20 includes a data reading unit 6 configured to read programs and data stored on a CD-ROM or a DVD-ROM, a subsidiary storage device 5 configured to store thereon programs and data, an operation unit 7 for inputting various kinds of information required for operating the information processing device 20, and a display unit 8 configured to display thereon an image. Further, the information processing device 20 includes a control unit 10 configured to control each unit included in the information processing device 20 (e.g., the data reading unit 6 and the operation unit 7), a network interface (I/F) 9 for connecting the information processing device 20 to the LAN, and a USB interface (I/F) 14 configured to perform data communication with an external device via a USB cable.

The operation unit 7 includes a known external input device such as a mouse and a keyboard. Further, the operation unit 7 is connected with the control unit 10 via a connection portion such as the USB I/F 14 to accept an input of various kinds of information. In addition, the display unit 8 is configured with a known device such as a liquid crystal display device (LCD) and connected with the control unit 10 via a connection portion such as a video board (not shown) to display thereon an image outputted from the control unit 10. On the display unit 8, a user interface screen through which various kinds of information are inputted and a mouse pointer are displayed with a known graphical user interface (GUI) function of the information processing device 20.

Furthermore, the control unit 10 includes a ROM 12 configured to store thereon data required to be saved even when the information processing device 20 is powered OFF, a RAM 13 configured to store thereon data (program) transferred from the subsidiary storage device 5 and data temporarily generated in processing, and a CPU 11 configured to execute programs stored on the ROM 12 and the RAM 13.

The subsidiary storage device 5 includes a known hard disk drive (HDD) configured integrally with a high capacity disk and a reading unit. The subsidiary storage device 5 is provided with at least a system folder in which various system files required for operation of an OS and/or application programs are stored and a registry in which information for operating application programs is stored.

Further, the information processing device 20 has a known operating system (hereinafter referred to as an OS) installed therein, which is provided with a multitask function of concurrently executing a plurality of processes. Under the OS, the information processing device 20 can execute application programs such as a document data creating program and an image processing program, the device driver, and an installation program (i.e., an installer).

<Regarding Device Driver and Installation Program>

Next, explanations will be given for an installation package that holds together the device driver for controlling the image forming device 30 and the installation program for installing the device driver into the information processing device 20.

Figure 2:
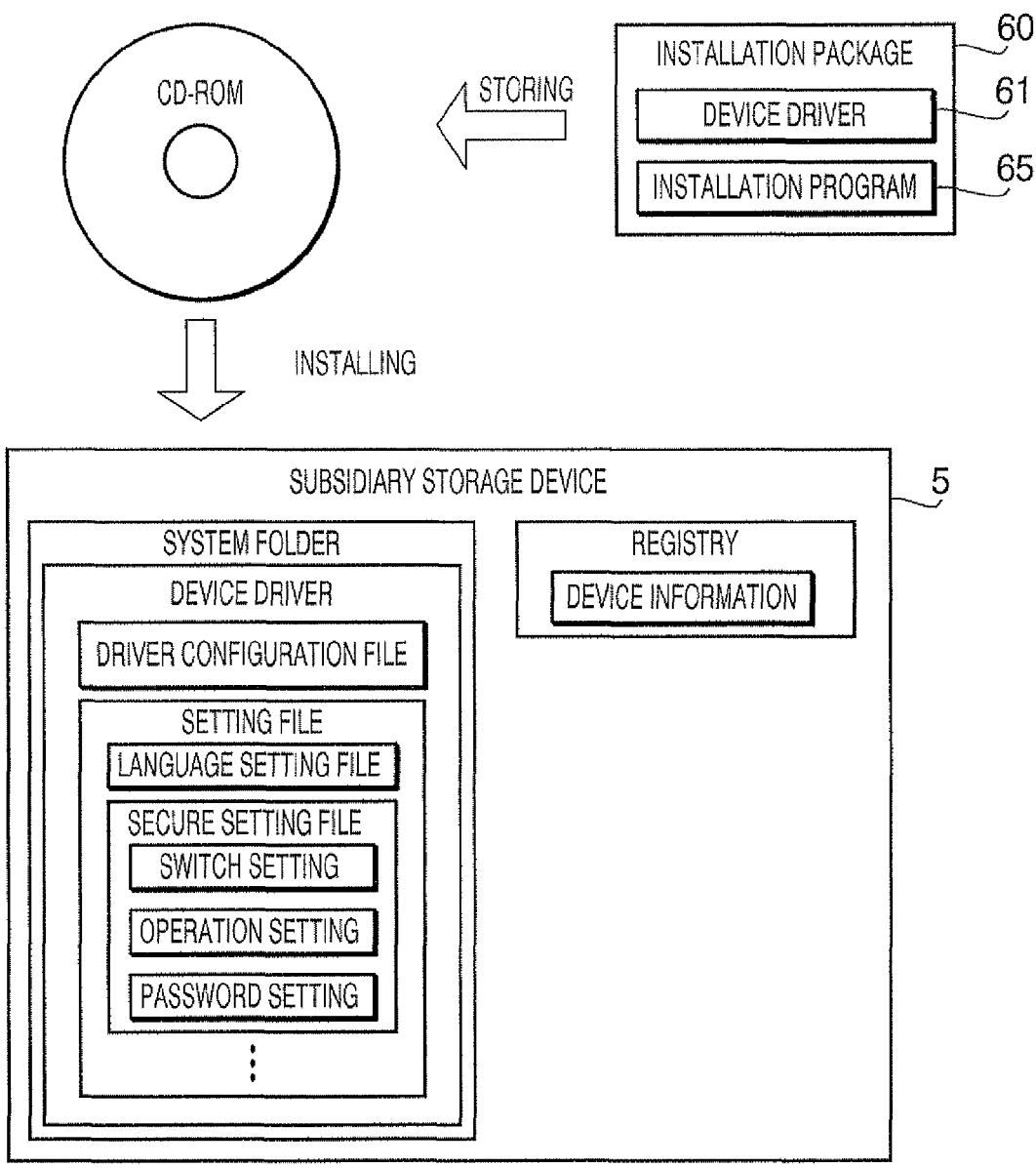
FIG. 2 is a schematic diagram for illustrating an installation package in the embodiment according to one or more aspects of the present invention.

FIG. 2 is a schematic diagram for illustrating an installation package. An installation package 60 includes a device driver 61 for generating print data in conjunction with an application program and controlling the image forming device 30 and an installation program 65 for installing the device driver 61 into the information processing device 20.

It is noted that the installation package 60 of the present embodiment is distributed from a software provider in a state stored on a removable storage medium such as a CD-ROM and a DVD-ROM, and read out from a reading device (e.g., the data reading unit 6 of the information processing device 20) that conforms to each storage medium.

Incidentally, the installation of the device driver 61 represents a following known process. Specifically, a setting file is created that the information processing device 20 refers to when the image forming device 30 is controlled (namely, when the device driver 61 is executed). Then, the created setting file and a driver configuration file for controlling the image forming device 30 that is included in the device driver 61 are stored in a predetermined area (for instance, a system folder) of the subsidiary storage device 5 managed by the OS. Further, device information, which includes correspondence relationships between the aforementioned files and the image forming device 30 such as reference destinations of the files, is registered in the registry.

The setting file includes a language setting file in which settings on a display language on a user interface screen outputted on the display unit 8 in execution of the device driver 61 are stored and a secure setting file in which information referred to when the header of the print data is created is stored.

The secure setting file includes an operation setting, a switch setting, and a password setting. In the operation setting, the operation setting flag representing a default operation mode is stored. In the switch setting, a switch flag, which represents whether a change of the default operation mode is acceptable in execution of the device driver 61, is stored. The password setting is referred to in order to write, into the header of the print data, the identification information for identifying the user, in execution of the device driver 61.

The setting file further includes an output port based upon an IP address of the image forming device 30 and control settings required for using the image forming device 30.

Namely, in the present embodiment, when the device driver 61 conforming to the image forming device 30 is installed, as shown in FIG. 2, the driver configuration file and the setting file included in the device driver 61 are stored in the system folder, and the device information is registered in the registry.

<Regarding Installation Process>

Subsequently, an installation process will be described, which is executed by the CPU 11 in accordance with the installation program.

Figure 4:
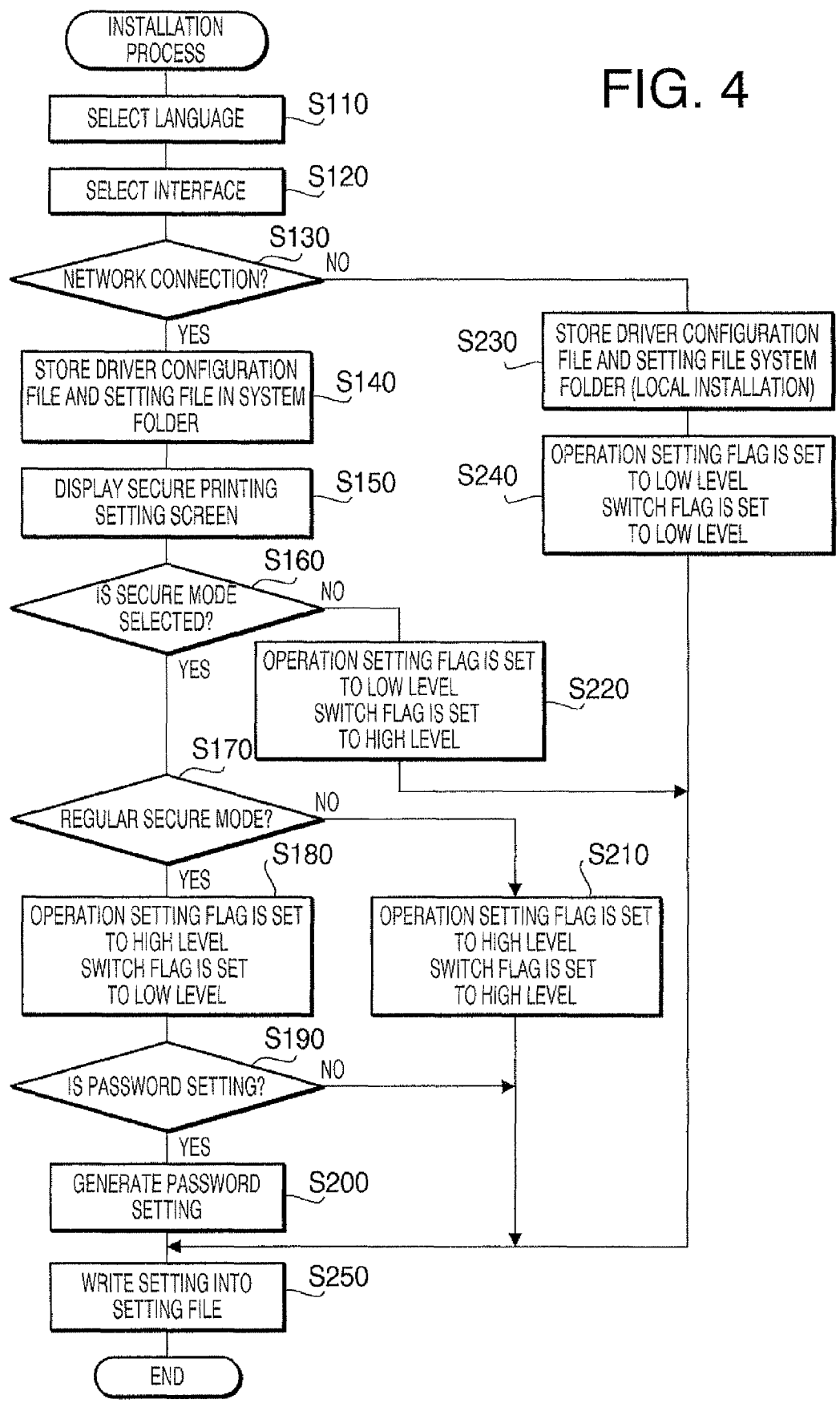
FIG. 4 is a flowchart showing a procedure of an installation process in the embodiment according to one or more aspects of the present invention.

FIG. 4 is a flowchart showing a procedure of an installation process. The installation process is executed by the CPU 11 of the information processing device 20 after the installation package is read out by the data reading unit 6. As illustrated in FIG. 4, when the installation process is performed, firstly in S110, a setting input screen for selecting a display language on the user interface screen is displayed on the display unit 8. Then, when user selection of a display language is accepted through the setting input screen, the present process goes to S120.

It is noted that the setting input screen represents a user interface screen displayed on the display unit 8 to accept an input via the operation unit 7. Additionally, display languages selectable in S110 include Japanese, English, French, Spanish, Arabic, and Pekingese.

In a subsequent step S120, a setting input screen for selecting a connection mode between the image forming device 30 and the information processing device 20 is displayed on the display unit 8. Then, when user selection of a connection mode is accepted through the setting input screen, the present process advances to S130. In the present embodiment, selectable connection modes include a connection via the LAN (hereinafter referred to as a network connection) and a connection via a USB cable (hereinafter referred to as a local connection).

Then, in S130, it is determined whether the connection mode selected in S120 is the network connection. When it is determined that the selected connection mode is the network connection (S130: Yes), the present process goes to S140. In S140, a folder into which the device driver 61 is installed (an installation destination folder) is generated in the system folder on the subsidiary storage device 5. Then, the driver configuration file acquired from the removable storage medium is stored in the installation destination folder generated. Further, an area in which the setting file is stored is secured on the subsidiary storage device 5, and the output port and the control settings included in the setting file are saved in the secured area.

In a subsequent step S150, a setting input screen (hereinafter referred to as a secure printing setting screen), on which the user is allowed to select an operation mode in which the image forming device 30 is operated by default, is displayed on the display unit 8. Then, when the operation mode selected by the user via the secure printing setting screen is accepted, the present process advances to S160.

Figure 5:
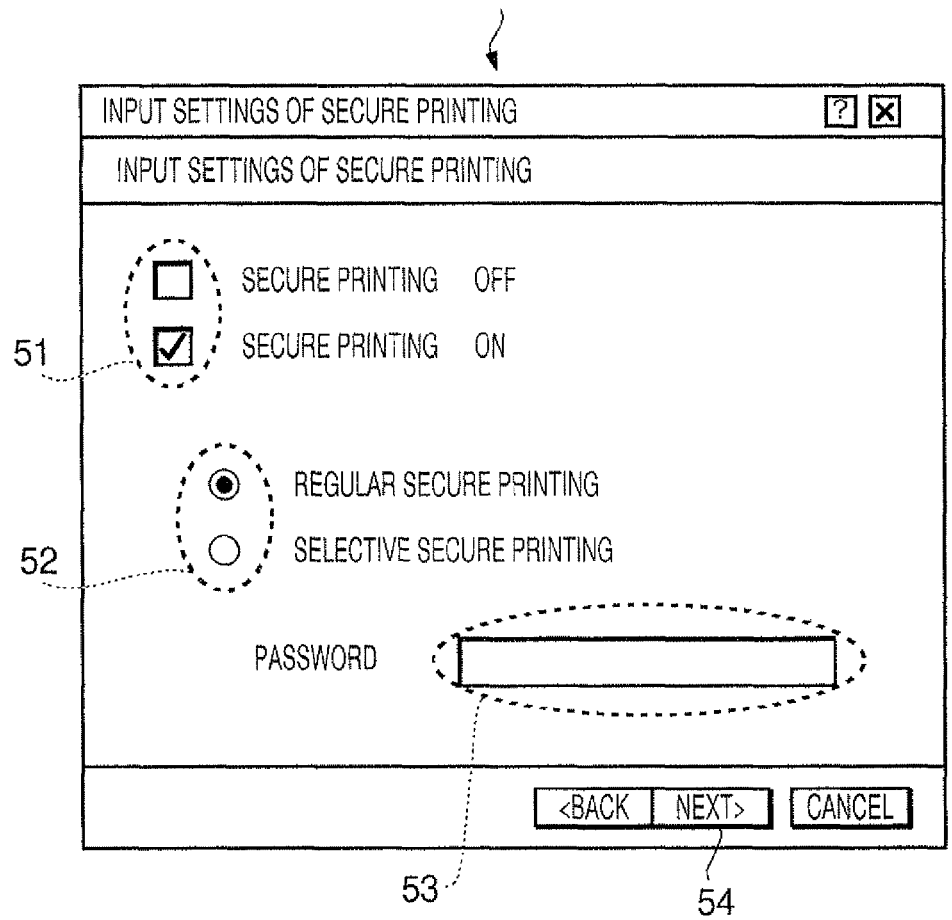
FIG. 5 is an illustration schematically showing a secure printing setting screen in the embodiment according to one or more aspects of the present invention.

As shown in FIG. 5, the secure printing setting screen of the present embodiment includes an operation mode selecting section 51, an execution selecting section 52, a password input section 53, and a "Next" button 54 to be pressed when input operations are completed. The operation mode selecting section 51 is provided to select one of the normal mode and the secure mode as the default operation mode. The execution selecting section 52 is provided to select one of a regular secure mode in which the secure printing is always performed and a selective secure mode in which it is determined, in time point when the printing operation is executed, whether the secure printing is performed, when the secure mode is selected in the operation mode selecting section 51. The password input section 53 is provided to accept the identification information when the regular secure mode is selected in the execution selecting section 52.

The operation mode selecting section 51 is configured to accept the selection between the normal mode (in FIG. 5, "Secure Printing OFF") and the secure mode (in FIG. 5, "Secure Printing ON") through an input into a desired one of check boxes. The execution selecting section 52 is configured to accept the selection between the regular secure mode and the selective secure mode through an input into a desired one of radio buttons when the secure mode is selected in the operation mode selecting section 51. The password input section 53 is configured to accept an input of characters via the operation unit 7 when the regular secure mode is selected in the execution selecting section 52.

In the present embodiment, when the "Next" button 54 is pressed, the input in each section 51, 52, or 53 is accepted. In a subsequent step S160, it is determined whether the input accepted in the operation mode selecting section 51, among the settings accepted in S150, specifies the secure mode as the default operation mode. When it is determined that the input accepted in the operation mode selecting section 51 specifies the secure mode as the default operation mode (S160: Yes), the present process goes to S170.

In S170, it is determined whether the input accepted in the execution selecting section 52 specifies the regular secure mode. When it is determined that the input accepted in the execution selecting section 52, among the settings accepted in S150, specifies the regular secure mode (S170: Yes), the present process goes to S180.

In S180, according to the inputs accepted in S150, the operation setting flag is set to a high level, and the switch flag is set to a low level. It is noted that the operation setting flag at the high level represents the secure mode as the default operation mode while the operation setting flag at the low level represents the normal mode as the default operation mode. Further, the switch flag at the high level represents that the default operation mode can be changed when the device driver is executed. Meanwhile, the switch flag at the low level represents that the default operation mode cannot be changed.

In a subsequent S190, it is determined whether the inputs accepted in S150 include identification information (password). When it is determined that the inputs accepted in S150 include identification information (S190: Yes), the present process advances to S200.

In S200, a password setting, in which the identification information inputted in the password input section 53 is included, is generated and saved in the setting file. Thereby, the inputted identification information is always utilized as fixed default information. Thereafter, the present process goes to S250.

Meanwhile, when it is determined in S190 that the inputs accepted in S150 do not include any identification information (S190: No), the present process goes to S250 without executing the step S200 (namely without generating the password setting). Thereby, it is required to input the identification information each time the header of the print data is created (namely, each time the secure printing is performed), Meanwhile, when it is determined in S170 that the input accepted in the execution selecting section 52 does not specify the regular secure mode, namely, when it is determined that the input accepted in the execution selecting section 52 specifies the selective secure mode (S170: No), the present process advances to S210. In S210, according to the input accepted in S150, the switch flag is set to the high level, and the operation setting flag is set to the high level. Thereafter, the present process goes to S250.

Further, when it is determined that the input accepted in S150 does not specify the secure mode but the normal mode as the default operation mode (S160: No), the present process goes to S220. In S220, according to the input accepted in S150, the switch flag is set to the high level, and the operation setting flag is set to the low level. Thereafter, the present process advances to S250.

Meanwhile, when it is determined in S130 that the selected connection mode is the local connection (S130: No), the present process goes to S230. In S230, the installation destination folder is generated in the system folder, and the driver configuration file acquired from the removal storage medium is stored into the generated installation destination folder. Along with this, an area to store therein the setting file is secured on the subsidiary storage device 5, and files (e.g., the language setting file and the control settings) in the setting file other than the secure setting file are stored into the secured area in the subsidiary storage device 5.

In a subsequent step S240, the switch flag is set to the low level, and the operation setting flag is set to the low level. Thereafter, the present process goes to S250, in which the settings of the switch flag and the operation setting flag at this time are written into the switch setting and the operation setting, respectively. Further, the device information is registered in the registry.

Namely, when the present process advances to S250 via S180, the switch flag at the low level is stored as the switch setting, and the operation setting flag at the high level is stored as the operation setting. Further, when the present process advances to S250 via S210, the switch flag at the high level is stored as the switch setting, and the operation setting flag at the high level is stored as the operation setting.

In addition, when the present process advances to S250 via S220, the switch flag at the high level is stored as the switch setting, and the operation setting flag at the low level is stored as the operation setting. Further, when the present process advances to S250 via S240, the switch flag at the low level is stored as the switch setting, and the operation setting flag at the low level is stored as the operation setting.

After the step S250, the installation process is terminated. In other words, when the installation process of the present embodiment is executed, in the case via S180 (i.e., in the case of the network connection where the regular secure mode is selected), in the information processing device 20 into which the device driver 61 has been installed, the secure mode is set as the default operation mode.

Further, when the installation process is performed, in the case via S240 (i.e., in the case of the local connection), the normal mode is set as the default operation mode in the information processing device 20 into which the device driver 61 has been installed.

Meanwhile, when the installation process is executed, in the case where the device driver 61 is installed via S210 or S220 (namely, in the network connection without the regular secure mode being set), an operation mode can be selected each time printing is executed in the image forming device 30. Namely, the default operation mode can be changed.

Accordingly, when the device driver 61 is executed in the information processing device 20 into which the device driver 61 has been installed in this manner, the information processing device 20 first checks the switch flag stored in the switch setting.

As a result of the checking, when the switch flag is set at the low level, the operation setting flag stored in the operation setting is checked. When the operation setting flag is set at the low level, the print data is created with the operation flag specifying the normal mode written in the header thereof and transmitted to the image forming device 30.

Meanwhile, when the operation setting flag is at the high level, the print data is created with the operation flag specifying the secure mode and a user ID previously assigned to the information processing device 20 that has executed the device driver 61 written in the header thereof. Further, when identification information is stored in the password setting, the stored identification information is written into the header as a password. Meanwhile, when identification information is not stored in the password setting, print data is created with identification information, which is accepted via the user interface screen when the device driver 61 is executed, written in the header thereof. Then, the created print data is transmitted to the image forming device 30.

It is noted that, as a result of the checking of the switch flag, when the switch flag is at the high level, print data is created with the operation flag specifying an operation mode accepted via the user interface screen, the user ID, and the password written in the header thereof. Then, the created print data is transmitted to the image forming device 30.

As described above, in the installation process of the present embodiment, when the connection mode between the information processing device 20 and the image forming device 30 is the network connection in which a plurality of information processing devices 20 may use the same image forming device 30 in common, the default operation mode is selected by the user via the user interface screen. On the contrary, when the connection mode is the local connection in which the information processing device 20 and the image forming device 30 establish one-on-one connection therebetween, since the confidentiality of the image formed on the recording medium by the image forming device 30 is easily maintained, the normal mode is automatically set as the default operation mode.

Thus, by executing the installation program of the present embodiment, in the information processing device 20 into which the device driver 61 has been installed, one of the normal mode and the secure mode is set as the default operation mode in accordance with the connection mode between the information processing device 20 and the image forming device 30.

Effects of Embodiment

As described above, according to the installation program of the present embodiment, depending on how the print system 1 is used, an appropriate mode is set as the default operation mode.

Consequently, according to the installation program of the present embodiment, each time printing is performed in the image forming device 30, there is no need to configure necessary settings for each mode. Therefore, it is possible to reduce user efforts.

Further, according to the installation program of the present embodiment, when the connection mode is the local connection, the normal mode is automatically set as the default operation mode. Hence, it is possible to prevent the secure mode from being unnecessarily set. Thus, it is possible to save troubles taken for the certification when an image forming operation is executed.

In the installation program of the present embodiment, when the secure mode is selected as the default operation mode, one of the regular secure mode and the selective secure mode is selected by the user. Therefore, when the user prints a highly confidential image, the user can certainly maintain the confidentiality of the image formed by the image forming device 30 by inputting the identification information each time the image forming operation is performed in the selective secure mode.

Meanwhile, when the regular secure mode is selected, it is possible to reduce user efforts of inputting the identification information to be written into the print data on the information processing device 20.

Further, in the installation program of the present embodiment, when the device driver is installed into the information processing device 20, the setting input screen for selecting an operation mode as the default operation mode is displayed to induce the user to set the default operation mode therethrough.

Thus, according to the installation program of the present embodiment, it is possible to make the user certainly recognize that the operation modes includes the secure mode.

Hereinabove, the embodiments according to aspects of the present invention have been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

[Modifications]

In S150 and S160 of the installation process in the aforementioned embodiment, an operation mode is selected by the user. However, when the connection mode is the network connection, the secure mode may automatically be set as the default operation mode. In other words, the steps of S150 and S160 may be omitted in the installation process.

Thus, when the secure mode is automatically set as the default operation mode, it is possible to further certainly maintain the confidentiality of the image formed on the recording medium by the image forming device 30. In the network connection, two or more information processing devices are likely to use a single image forming device in common. Therefore, the secure mode is more likely to be selected than the normal mode in which it is difficult to maintain the confidentiality of an image to be formed on a recording medium.

Further, the print system 1 of the aforementioned embodiment is configured such that the default operation mode can be changed by setting the switch flag. Aspects of the present invention are not limited to the above configuration. For example, the default operation mode may be fixed for ever.

Further, in the installation process of the aforementioned embodiment, the connection mode is determined based upon the user selection in S120. However, the connection mode may be determined to be the network connection or the local connection by electrically detecting a LAN cable connected to the network I/F 9 or a USB cable connected to the USB I/F 14, respectively.

What is claimed is:

1. An information processing device configured to be connected with an image forming device, comprising:
a processor configured to perform:
detecting which connection mode of a local connection and a network connection is established between the information processing device and the image forming device;
installing into the information processing device a driver for controlling the image forming device to perform an image forming operation in one security-related operation mode of:
a normal mode in which the driver controls the image forming device to perform the image forming operation without user certification, and
a secure mode in which the driver controls the image forming device to perform the image forming operation after successful user certification;
setting, when the detected connection mode is the local connection, the normal mode as a default security-related operation mode in such an unchangeable manner as to maintain the normal mode whenever the image forming operation is performed by the image forming device;
determining, when the detected connection mode is the network connection, whether to set the secure mode as the default security-related operation mode;
setting, when determining not to set the secure mode as the default security-related operation mode, the normal mode as the default security-related operation mode in such a changeable manner as to determine whether to maintain the normal mode each time the image forming operation is performed by the image forming device;
determining, when determining to set the secure mode as the default security-related operation mode, whether to set the secure mode in such an unchangeable manner as to maintain the secure mode whenever the image forming operation is performed by the image forming device;
setting, when determining to set the secure mode in such the unchangeable manner as to maintain the secure mode whenever the image forming operation is performed by the image forming device, the secure mode as the default security-related operation mode in such the unchangeable manner as to maintain the secure mode whenever the image forming operation is performed by the image forming device; and
setting, when determining not to set the secure mode in such the unchangeable manner as to maintain the secure mode whenever the image forming operation is performed by the image forming device, the secure mode as the default security-related operation mode in such a changeable manner as to determine whether to maintain the secure mode each time the image forming operation is performed by the image forming device.

2. The information processing device according to claim 1, wherein the processor is further configured to perform:
accepting an input to select the secure mode as the default security-related operation mode when the detected connection mode is the network connection in which the information processing device is connected with the image forming device so as to be able to use the image forming device in common with another information processing device; and setting the secure mode as the default security-related operation mode when the input to select the secure mode is accepted.

3. The information processing device according to claim 1, wherein the processor is further configured to perform:

accepting an input of identification information for identifying the information processing device when the secure mode is specified; and setting the accepted identification information as fixed default information to be used for the user certification in the secure mode.

4. A method comprising:

detecting which a connection mode of a local connection and a network connection is established between an information processing device and an image forming device;

installing into the information processing device a driver for controlling the image forming device to perform an image forming operation in one security-related operation mode of:

a normal mode in which the driver controls the image forming device to perform the image forming operation without user certification, and a secure mode in which the driver controls the image forming device to perform the image forming operation after successful user certification;

setting, when the detected connection mode is the local connection, the normal mode as a default security-related operation mode in such an unchangeable manner as to maintain the normal mode whenever the image forming operation is performed by the image forming device;

determining, when the detected connection mode is the network connection, whether to set the secure mode as the default security-related operation mode;

setting, when determining not to set the secure mode as the default security-related operation mode, the normal mode as the default security-related operation mode in such a changeable manner as to determine whether to maintain the normal mode each time the image forming operation is performed by the image forming device;

determining, when determining to set the secure mode as the default security-related operation mode, whether to set the secure mode in such an unchangeable manner as to maintain the secure mode whenever the image forming operation is performed by the image forming device;

setting, when determining to set the secure mode in such the unchangeable manner as to maintain the secure mode whenever the image forming operation is performed by the image forming device, the secure mode as the default security-related operation mode in such the unchangeable manner as to maintain the secure mode whenever the image forming operation is performed by the image forming device; and setting, when determining not to set the secure mode in such the unchangeable manner as to maintain the secure mode whenever the image forming operation is performed by the image forming device, the secure mode as the default security-related operation mode in such a changeable manner as to determine whether to maintain the secure mode each time the image forming operation is performed by the image forming device.

5. The method according to claim 4, further comprising:

accepting an input to select the secure mode as the default operation mode when the detected connection mode is the network connection in which the information processing device is connected with the image forming device so as to be able to use the image forming device in common with another information processing device; and setting the secure mode as the default security-related operation mode when the input to select the secure mode is accepted.

6. The method according to claim 4, further comprising:

accepting an input of identification information for identifying the information processing device when the secure mode is specified; and setting the accepted identification information as fixed default information to be used for the user certification in the secure mode.

7. A computer readable storage device having computer executable instructions stored thereon that, when executed, cause an information processing device configured to be connected with an image forming device to perform:

detecting which connection mode of a local connection and a network connection is established between the information processing device and the image forming device;

installing into the information processing device a driver for controlling the image forming device to perform an image forming operation in one security-related operation mode of:

a normal mode in which the driver controls the image forming device to perform the image forming operation without user certification, and a secure mode in which the driver controls the image forming device to perform the image forming operation after successful user certification;

setting, when the detected connection mode is the local connection, the normal mode as a default security-related operation mode in such an unchangeable manner as to maintain the normal mode whenever the image forming operation is performed by the image forming device;

determining, when the detected connection mode is the network connection, whether to set the secure mode as the default security-related operation mode;

setting, when determining not to set the secure mode as the default security-related operation mode, the normal mode as the default security-related operation mode in such a changeable manner as to determine whether to maintain the normal mode each time the image forming operation is performed by the image forming device;

determining, when determining to set the secure mode as the default security-related operation mode, whether to set the secure mode in such an unchangeable manner as to maintain the secure mode whenever the image forming operation is performed by the image forming device;

setting, when determining to set the secure mode in such the unchangeable manner as to maintain the secure mode whenever the image forming operation is performed by the image forming device, the secure mode as the default security-related operation mode in such the unchangeable manner as to maintain the secure mode whenever the image forming operation is performed by the image forming device; and setting, when determining not to set the secure mode in such the unchangeable manner as to maintain the secure mode whenever the image forming operation is performed by the image forming device, the secure mode as the default security-related operation mode in such a changeable manner as to determine whether to maintain the secure mode each time the image forming operation is performed by the image forming device.

8. The computer readable storage device according to claim 7, wherein the computer executable instructions, when executed, further cause the information processing device to perform:

accepting an input to select the secure mode as the default security-related operation mode when the detected connection mode is the network connection in which the information processing device is connected with the image forming device so as to be able to use the image forming device in common with another information processing device; and setting the secure mode as the default security-related operation mode when the input to select the secure mode is accepted.

9. The computer readable storage device according to claim 7, wherein the computer executable instructions, when executed, further cause the information processing device to perform;

accepting an input of identification information for identifying the information processing device when the secure mode is specified; and setting the accepted identification information as fixed default information to be used for the user certification in the secure mode.

* * * * *